April 23, 1929.  H. D. POWNALL ET AL  1,709,875
LIQUID LEVEL GAUGE
Filed July 9, 1924  2 Sheets-Sheet 1
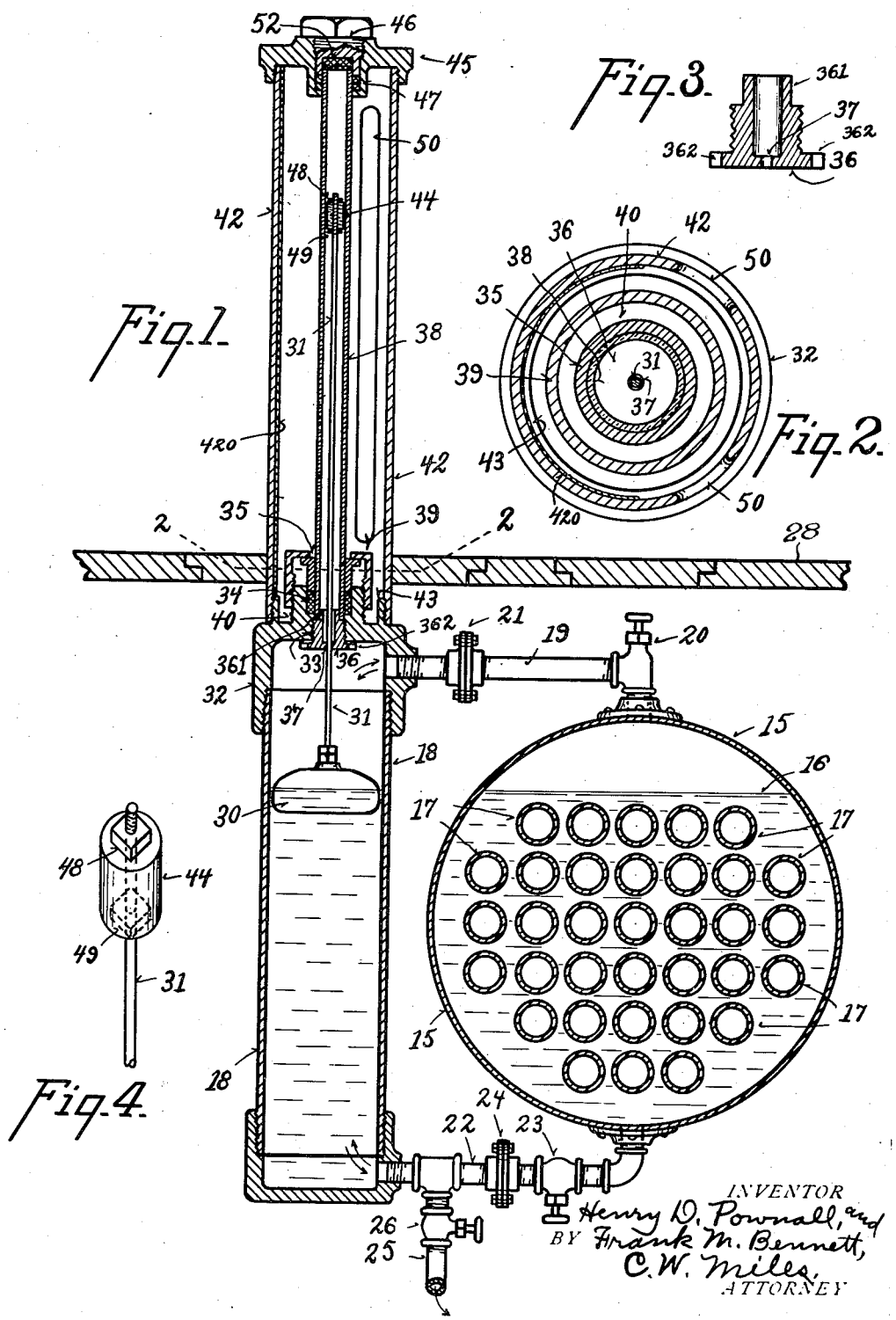

Patented Apr. 23, 1929.

1,709,875

UNITED STATES PATENT OFFICE.

HENRY D. POWNALL AND FRANK M. BENNETT, OF CANTON, OHIO; SAID POWNALL ASSIGNOR, BY MESNE ASSIGNMENTS, TO YORK ICE MACHINERY CORPORATION, OF YORK, PENNSYLVANIA, A CORPORATION OF DELAWARE.

LIQUID-LEVEL GAUGE.

Application filed July 9, 1924. Serial No. 725,074.

Our invention relates to improvements in liquid level gauges. One of its objects is to provide an improved liquid level gauge for use with steam and liquefied gases, and for other similar purposes. Another object is to provide an improved liquid level gauge adapted to register on a floor or other location above the location of the liquid container. Another object is to provide a liquid level gauge which may be used with safety in connection with liquefied gases or other liquids which give off poisonous or dangerous fumes or vapors. Another object is to provide a gauge the readings of which are not liable to be obscured by the formation of frost or ice thereon. Another object is to provide an improved liquid level gauge in which a broken gauge glass tube may be safely replaced even where the gauge is employed to indicate the liquid level of liquefied ammonia gas, liquefied chlorine gas, water in a boiler under high pressure, or under like circumstances where to replace a gauge tube would ordinarily be dangerous. Our invention also comprises certain details of form and combination of components, all of which will be fully set forth in the description of the accompanying drawings in which:

Fig. 1 is a central vertical section through our improved liquid gauge and a liquid storage reservoir the liquid level in which it is desired to indicate.

Fig. 2, is an enlarged sectional detail view taken on line 2—2 of Fig. 1.

Fig. 3, is a central sectional view of a perforated bushing detached.

Fig. 4, is a perspective view of the liquid level indicator.

Figure 5:
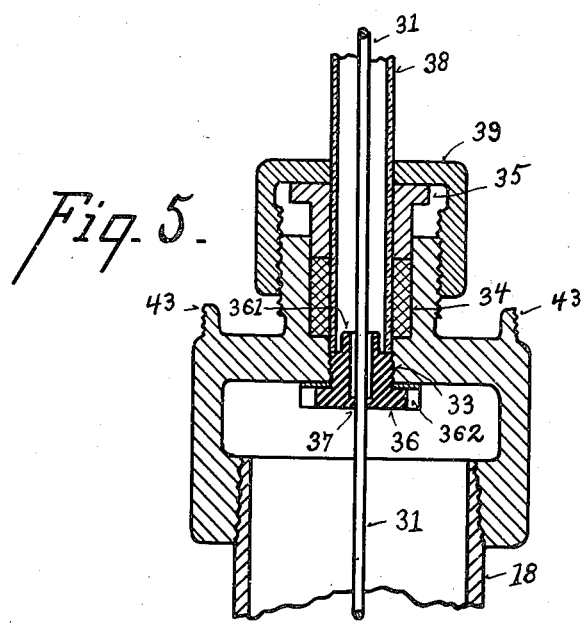
Fig. 5, is an enlarged sectional detail view of a portion of Fig. 1.

The accompanying drawings illustrate the preferred embodiments of our invention in which 15 represents a liquid storage reservoir, as for instance the brine cooler of an artificial ice machine in which tank is stored a body of liquefied anhydrous ammonia or other liquefied gas used as a refrigerant, and having a liquid level line 16 usually maintained in the upper portion of said tank so as to submerge the flue tubes 17 in such liquid. A liquid level indicator tank 18, preferably a vertical cylindrical container is located adjacent to the main reservoir 15 at one side thereof. A connecting conduit 19 having a controlling valve 20, and preferably a flange union 21 serves to connect the upper portion of the reservoir 15 with the upper portion of the indicator tank 18. The conduits 19 and 22 at the top and bottom of the tank 18 enable the gas and liquid in the tank 18 to flow to or from the tank 18 to automatically find and keep a true and reliable liquid level within the tank 18. A connecting conduit 22 having a controlling valve 23 and preferably a flange union 24 serves to connect the lower portion of reservoir 15 with the lower portion of the indicator tank 18. A branch conduit 25 provided with a controlling valve 26 serves to conduct or drain any waste gas or liquid from the reservoir 15 or the tank 18, to a drain or sewer at such times as it may be necessary to drain the tank 18 or reservoir 15 for repairs or replacement, or to drain away impurities which may collect at the bottom of the tank or reservoir.

The tank 18 is preferably located close to the reservoir 15 where it is desirable to avoid heat losses, but otherwise may be located at some distance from the reservoir if more convenient to take the liquid level readings at a distance from the reservoir 15. As illustrated and as applied to an artificial ice machine, it is designed that both the reservoir 15 and the tank 18 be submerged in brine in a brine cooler tank, not shown, of which brine cooler tank the floor 28 represents the cover, arrangements being made to maintain a rapid circulation of brine both through the flues 17, and also in contact with the exterior face of the reservoir 15 in order to efficiently exchange heat from the brine into the liquefied gas within the reservoir 15 thereby causing ebullition of the liquid within the reservoir 15 to use up the heat so absorbed. Liquefied gas is regularly supplied through a valve controlled conduit, not shown, to the reservoir 15 to take the place of that evaporated, and the vapor or gas developed in the reservoir 15 is conducted away to a gas compressor through a valve controlled conduit, not shown, leading from the upper portion of the reservoir 15.

Due to the conduits 19 and 22 the liquid level is maintained at an equal height in both the reservoir 15 and the tank 18, and any fluctuation of the liquid level in the reservoir is correspondingly indicated in the tank 18. A sheet metal float 30 floats or rides on the surface of the liquid in the tank 18 and rises and falls to correspond to fluctuations in the liquid level from time to time in the reservoir 15 and tank 18. Rigidly attached to the upper face of the float 30 is a vertical tempered steel rod or wire 31 which also rises and falls with the float 30.

The upper head 32 of the tank 18 is provided with a threaded perforation 33 through which the rod 31 projects upwardly and with a stuffing or packing box 34 and packing gland 35. A metallic sleeve or bushing 36 is threaded into the perforation 33 and has a central bore 37 of only slightly greater diameter than the diameter of the rod 31, as for instance a difference in diameter of one to two thousandths of an inch. The bushing 36 is preferably of tempered steel and accurately and smoothly drilled and finished and is seated in the upper head 32 below the stuffing box 34 with the rod 31 projecting upwardly through its bore with only sufficient clearance for the rod 31 to move freely upwardly and downwardly through the bore of the bushing 36 and with very little space between the rod 31 and the walls of the bore 37 through which gas or liquid might escape upwardly from the tank 18.

The gauge tube 38 of transparent material is supported and centered at its lower end upon the bushing 36 and is surrounded with the packing in the stuffing box 34 to provide a gas tight joint between the lower end of the gauge tube 38 and the head 32. A nut 39 is threaded to a flange 40 on the head 32 to force the packing and the gland 35 into the stuffing box. A metal tube 42 substantially concentric with the tube 38 is threaded to a flange 43 on the head 32 to serve as a guard and protecting housing for the tube 38. The tube 42 is slotted longitudinally at 50 to enable the gauge tube 38, a liquid level scale 420 attached to said tube 42 and a liquid level pointer or indicator 44 to be observed through the slots in the tube 42.

As illustrated in Figs. 1 and 5 the sleeve or bushing 36 is threaded into the perforation 33 from below preferably by means of a spanner wrench engaging recesses 362 in the head of bushing 36. A reduced tubular section 361 of the bushing serves to center or guide the lower end of the gauge tube into position.

Figure 6:
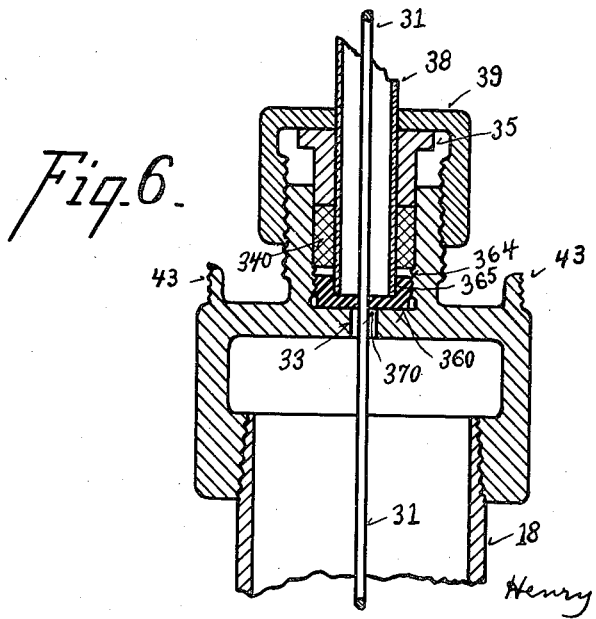
Fig. 6, is a view similar to Fig. 5 illustrating a modification thereof.

In the modification Fig. 6, the bushing 360 corresponding to the bushing 36 of Figs. 1, and 5 is introduced from above, and is preferably threaded into the lower end of the stuffing box 340 preferably by means of a spanner wrench engaging recesses 364 at the top of the bushing 360. The bushing 360 is counter-bored at 365 to receive and guide the lower end of the gauge tube into position with reference to the bushing 360 and the stuffing box. The bushing 360 is provided with a restricted orifice 370 corresponding to the orifice 37 of Fig. 5.

At the upper end of the tube 42 is a metal cap 45 threaded to the tube 42. The cap 45 is preferably perforated to receive a gland 46 which is threaded to the cap 45 and serves to apply tension to an annular packing located in the stuffing box 47 to provide a gas tight joint between the cap 45 and the upper end of the gauge tube 38. Other means than that shown may be employed to secure a gas tight joint at the upper end of the tube 38.

Mounted upon the upper end of the rod 31 is an indicator or pointer 44 preferably a colored cylinder of cork or other relatively light weight material held in place relative to the rod 31 for instance by means of nuts 48 and 49 threaded to the rod 31 above and below the pointer 44. The pointer 44 moves vertically within the tube 38 with the rod 31 and the float 30 to indicate upon a scale such as shown at 420 in Fig. 1 for instance, or which may be attached to or cut upon the gauge tube 38 or inclosed with the tube 38 within the tube 42. The rod 31 and pointer 44 being of relatively light weight compared with the displacement capacity of the float 30, enable the readings to be taken with accuracy on the next floor above the tank 18 and reservoir 15, which is an important advantage. Also due to the small space available for the escape of ammonia vapor, live steam or other gas or vapor liable to be contained in the tank 18 with the liquid to be gauged, there is practically no danger in the event of the gauge tube 38 being accidentally fractured of any considerable escape of gas or, an injury to any one in the vicinity thereof or any necessity to close down the operation of the apparatus in order to replace a gauge tube since the amount of gas or vapor leakage possible is so small as not to be objectionable or dangerous to an operator engaged in replacing the gauge tube.

The apparatus herein shown and described is capable of considerable modification within the scope of the claims without departing from the spirit of our invention.

What we claim is:

1. A liquid level gauge comprising a float chamber, a float supported upon and movable vertically with a column of liquid within said float chamber, a rod carried by and projecting upwardly from said float and movable vertically with said float, there being a restricted orifice in the upper end of said float chamber through which said rod projects and has unhampered movement vertically, and which orifice is at the same time adapted to preclude the escape of any appreciable volume of gas through said orifice past said rod, an indicator member mounted upon said rod above said restricted orifice, and an index scale over which said indicator member is movable to indicate variations in the liquid level within said float chamber, and a gas tight housing normally enclosing the upper end of said rod and said indicator member and provided with a transparent section through which the movements of said indicator member may be observed.

2. A liquid level gauge comprising a float chamber, a float supported upon and movable vertically with a column of liquid within said float chamber, there being a restricted orifice in the upper end of said float chamber, a rod carried by and projecting upwardly from said float through said restricted orifice and having unhampered movement vertically through said restricted orifice and at the same time through a close approximation to the bore of said orifice adapted to prevent the escape of any appreciable volume of gas through said orifice past said rod, an index scale, an indicator member mounted upon said rod above said restricted orifice and movable over said index scale to indicate variations in the liquid level within said float chamber, a gauge tube of transparent material detachably mounted above said restricted orifice and within which said rod and indicator member are free to move vertically, a perforated tubular housing for said gauge tube mounted rigidly relative to said float chamber, a cap mounted upon the upper end of said gauge tube housing and serving as a support for the upper end of said gauge tube and to take the end thrust of said gauge tube, and means to form gas tight joints at opposite ends of said gauge tube.

3. A liquid level gauge comprising a float chamber, a float supported upon and movable vertically with a column of liquid within said float chamber, there being a restricted orifice in the upper end of said float chamber, a rod carried by and projecting upwardly from said float through said restricted orifice and having unhampered movement vertically with said float, said restricted orifice serving to prevent the escape of any appreciable volume of gas through said orifice and past said rod due to the small amount of clearance space intervening between the wall of said orifice and the face of said rod, an indicator member mounted upon said rod above said restricted orifice and movable with said rod, a stationarily mounted index scale over which said indicator moves to indicate variations in the liquid level within said float chamber, a gauge tube of transparent material closed at its upper end with a gas tight joint and detachably mounted with a substantially gas tight joint to the exterior of said float chamber above said restricted orifice and within which gauge tube said rod and indicator member are free to move vertically, a tubular housing member for said gauge tube mounted rigidly relative to said float chamber and having a perforation through which the movements of said indicator member may be observed.

4. A liquid level gauge comprising a float chamber having independent conduits near the upper and lower ends thereof respectively for the flow of liquid and gaseous portions of the medium to be gauged to and from said float chamber, a float supported upon and movable vertically with a column of liquid within said float chamber, said float chamber having a restricted orifice at its upper end, a rod carried by said float and projecting upwardly therefrom and projecting with a close fit through said restricted orifice, said rod having unhampered movement through said orifice and at the same time adapted to prevent the escape of any appreciable volume of gas through said orifice past said rod, a gauge tube housing carried rigidly relative to said float chamber, a cap at the outer end of said housing, a gauge tube of transparent material supported at one end by said float chamber concentrically with said orifice and at the opposite end by the cap of said housing, means to form gas tight joints at opposite ends of said gauge tube, an indicator scale, and an indicator carried by said rod within said gauge tube adapted to indicate upon said scale changes in the liquid level within said float chamber.

5. A liquid level gauge comprising a float chamber, a float supported upon and movable vertically with a column of liquid within said float chamber, said float chamber being provided with a perforation through its upper end, a bushing rigidly mounted in said perforation and provided with a restricted orifice, a rod carried by said float and projecting upwardly through the restricted orifice in said bushing and having unhampered movement vertically with said float and at the same time adapted to prevent the escape of any appreciable volume of gas through said orifice past said rod, a gauge tube fitted to the upper end of said bushing, a stuffing box above said bushing to provide a tight joint between the lower end of said gauge tube and the top wall of said float chamber, means to support said gauge tube with a tight joint at its opposite end, an index scale, and an indicator mounted upon said rod within said gauge tube and adapted to indicate changes in the liquid level within said float chamber upon said scale.

6. A liquid level gauge comprising a float chamber, a float supported upon and movable vertically with a column of liquid within said float chamber, said float chamber having a perforation through its top wall, a bushing threaded into said perforation and provided with a restricted orifice, a rod carried by and projecting upwardly from said float through said restricted orifice and having unhampered movement vertically with said float and at the same time adapted to prevent the escape of any appreciable volume of gas through said orifice past said rod, a gauge tube fitted to the upper end of said bushing, a stuffing box above said bushing to provide a tight joint between the lower end of said gauge tube and the top wall of said float chamber, means to support the free end of said gauge tube, a stuffing box at the free end of said gauge tube, an index scale, and an indicator mounted upon said rod within said gauge tube and movable with said rod and float to indicate upon said scale variations in the liquid level within said float chamber.

In testimony whereof we have hereunto affixed our signatures.

H. D. POWNALL.
FRANK M. BENNETT.